121,245

UNITED STATES PATENT OFFICE.

ERNEST C. HASERICK, OF LAKE VILLAGE, NEW HAMPSHIRE.

IMPROVEMENT IN PREPARING IRON CHIPS, SHAVINGS, &c., FOR MELTING.

Specification forming part of Letters Patent No. 121,245, dated November 28, 1871.

*To all whom it may concern:*

Be it known that I, ERNEST C. HASERICK, of Lake Village, in the county of Belknap and State of New Hampshire, have invented an Improvement in Preparing Iron Chips, Shavings, Turnings, and other small particles or minute pieces of iron for Melting; and I do hereby declare that the following is a full and exact description thereof.

The nature of my invention consists in aggregating iron turnings, chips, shavings, and other small pieces or particles of iron in molds or otherwise, whether by pressure or not, into blocks or lumps by means of clay or other equivalent earthy, mineral, or other substance, which will cause the particles to cohere, in order to prevent packing in the melting-furnace and obstructing the blast therein; and also, to protect the surfaces of the iron particles from burning up. In the Letters Patent granted to me March 13, 1866, and reissued May 22, 1866, a process was described whereby small pieces or particles of iron were to be coated with clay or other suitable substance which would protect the surfaces of the particles from contact with the oxygen of the atmosphere or blast in the furnace, and thereby prevent them from burning up during the process of melting. This was found to effect the purpose intended; but unless the melting process was conducted with caution, and the iron thus prepared was introduced into the cupola in small quantities at certain intervals of time, the furnace would be liable to become clogged by the particles settling into the interstices of the coal, and thereby choking the blast and retarding the fusion.

My present invention completely obviates this difficulty by aggregating into masses the small particles of iron before they are introduced into the furnace, and the substance used for massing or aggregating the particles also protects their surfaces from excessive oxidation and burning up. Various substances may serve to cause the particles of iron to cohere, and to protect them from burning up. But though other substances may be as good as common clay, yet, since that substance serves the purpose well in all respects, and is abundant and convenient to be obtained in almost all places, and costs little or nothing to procure, I believe no other substance to be better suited to the object, and shall suppose it to be employed in the following description of the process. And other liquid substances may be used for a diluent besides water, which, however, perfectly answers the purpose, and is also ready at hand without cost.

The method of carrying out this invention in its most simple way is substantially as follows: The clay is mixed with water so as to be in a properly liquid state—say in the proportion of a pailful of clay to ten pailfuls of water. The iron chips, shavings, turnings, or other particles are then united and stirred with this mixture until the particles are well covered with the wet clay. The mass is then formed into lumps or molded into blocks of any convenient or desired size and form. A small amount of compression or ramming is sufficient to compact the particles in the molds, or even none at all. But heavy pressure might be used, if desired, to make the blocks unusually strong—say for transportation. The blocks, after molding, are directly removed from the molds, and are allowed to dry till they can be handled without breaking, which ordinarily will be within twenty-four hours after the molding. Thus prepared, they are put into the melting-furnace like ordinary pig-iron, and are as readily and easily melted, without choking the blast; and the shielding protection of the clay is so complete that a very large percentage of cast-iron is obtained therefrom, suitable for many uses. A convenient size of the blocks or bricks will weigh about fifteen pounds each. The blocks may be made with perforations through them, more or fewer in number, and greater or less in size, in order to allow a freer passage to the blast through them in the furnace, and also to hasten their drying and hardening after molding. These perforations may be desirable, more especially when it is preferred to make the blocks large; but they are not generally necessary. The whole foregoing process of preparing the iron particles is quite inexpensive, not exceeding the cost of fifty cents for preparing a ton of the iron, even when it is done by hand. And the result is so satisfactory that no inconvenience whatever is experienced in the melting, and only a very slight loss of iron is sustained. Thus is utilized at a trifling expense a large amount of iron turnings, shavings, filings, and other particles, which all manufacturers in iron produce in greater or less quantities. And not only is the process desirable and valuable when the turnings, shavings, and filings are to be melted and used in the establishments where they are produced, but the blocks are very readily and conveniently transported to any distance, and may thus become an article of commerce.

What I claim as my invention, and desire to secure by Letters Patent, is—

1. The aggregation of chips, shavings, turnings, filings, or other small pieces or particles of iron into blocks or masses, by means of a substance which will cause them to cohere, and also will shield them from burning up in the melting furnace, substantially as and for the purpose herein specified.

2. The aggregated masses or blocks, as above described, when formed with perforations in the manner and for the purpose herein specified.

ERNEST C. HASERICK.

Witnesses:
E. H. BLAISDELL,
J. S. BROWN. (85)